US012700630B2

(12) United States Patent
Zhu et al.

(10) Patent No.: US 12,700,630 B2
(45) Date of Patent: Aug. 4, 2026

---

(54) BATTERY, BATTERY MODULE, BATTERY PACK, AND ELECTRIC VEHICLE

(71) Applicant: BYD COMPANY LIMITED, Shenzhen (CN)

(72) Inventors: Yan Zhu, Shenzhen (CN); Shichao Hu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 811 days.

(21) Appl. No.: 17/792,246

(22) PCT Filed: Jan. 8, 2021

(86) PCT No.: PCT/CN2021/070924
§ 371 (c)(1),
(2) Date: Jul. 12, 2022

(87) PCT Pub. No.: WO2021/143625
PCT Pub. Date: Jul. 22, 2021

(65) Prior Publication Data
US 2023/0110488 A1 Apr. 13, 2023

(30) Foreign Application Priority Data

Jan. 13, 2020 (CN) ......................... 202020064787.9
Jun. 10, 2020 (CN) ......................... 202021062203.0

(51) Int. Cl.
*H01M 50/119* (2021.01)
*B60L 50/64* (2019.01)
(Continued)

(52) U.S. Cl.
CPC ........... *H01M 50/119* (2021.01); *B60L 50/64* (2019.02); *H01M 10/0413* (2013.01);
(Continued)

(58) Field of Classification Search
CPC ............. H01M 50/119; H01M 50/209; H01M 50/133; H01M 50/184; H01M 50/159;
(Continued)

(56) References Cited

U.S. PATENT DOCUMENTS 5,173,379 A * 12/1992 Ichinose ............. H01M 50/154
429/185
2004/0146777 A1 7/2004 Forlino et al.
(Continued)

FOREIGN PATENT DOCUMENTS

CN 103094511 A 5/2013
CN 103824985 A 5/2014
(Continued)

OTHER PUBLICATIONS

CN201766132 translation (Year: 2017).*
International Search Report and Written Opinion for Application No. PCT/CN2021/070924, mailed on Mar. 26, 2021, 11 pages.

*Primary Examiner* — Jane J Rhee
(74) *Attorney, Agent, or Firm* — Sheppard Mullin Richter & Hampton LLP

(57) ABSTRACT

A battery, a battery module, a battery pack, and an electric vehicle are provided. The battery includes a metal housing, a packaging member, and multiple electrode core assemblies. The packaging member includes two packaging portions that are arranged opposite to each other. The two packaging portions are joined at a predetermined position to divide the internal space of the packaging member into multiple sealed accommodating cavities. At least one sealed accommodating cavity is provided with one of the electrode core assemblies. The metal housing is sleeved outside the packaging member.

25 Claims, 7 Drawing Sheets

(51) Int. Cl.

| | |
|---|---|
| *H01M 10/04* | (2006.01) |
| *H01M 50/133* | (2021.01) |
| *H01M 50/15* | (2021.01) |
| *H01M 50/159* | (2021.01) |
| *H01M 50/184* | (2021.01) |
| *H01M 50/209* | (2021.01) |

(52) U.S. Cl.
CPC ......... *H01M 50/133* (2021.01); *H01M 50/15* (2021.01); *H01M 50/159* (2021.01); *H01M 50/184* (2021.01); *H01M 50/209* (2021.01); *H01M 2220/20* (2013.01)

(58) Field of Classification Search
CPC ............. H01M 50/15; H01M 10/0413; H01M 2220/20
See application file for complete search history.

(56) References Cited

U.S. PATENT DOCUMENTS

| | | | |
|---|---|---|---|
| 2017/0025723 A1* | 1/2017 | Isozaki | .............. H01M 10/486 |
| 2018/0175346 A1 | 6/2018 | Schmid-Schoenbein | |
| 2019/0355940 A1* | 11/2019 | Satou | ................. H01M 50/103 |

FOREIGN PATENT DOCUMENTS

| | | | |
|---|---|---|---|
| CN | 204088488 U | 1/2015 |
| CN | 206225477 U | 6/2017 |
| CN | 108780856 A | 11/2018 |
| CN | 110518156 A | 11/2019 |
| CN | 110518174 A | 11/2019 |
| CN | 110571366 A | 12/2019 |
| CN | 110828717 A | 2/2020 |
| CN | 110828744 A | 2/2020 |
| CN | 110828746 A | 2/2020 |
| EP | 2590252 A2 | 5/2013 |
| JP | 2008-171579 A | 7/2008 |
| JP | 2013098167 A | 5/2013 |
| JP | 2014165089 A | 9/2014 |
| JP | 2016-046113 A | 4/2016 |
| JP | 6376273 B2 | 8/2018 |
| WO | 2016132404 A1 | 8/2017 |

* cited by examiner

100

11

111

112

L

100

112

12    123         12                    12          112

122   121   122   121   123              111

BATTERY, BATTERY MODULE, BATTERY PACK, AND ELECTRIC VEHICLE

CROSS-REFERENCE TO RELATED APPLICATIONS

This application is a national phase application of International Patent Application No. PCT/CN2021/070924, filed with the China National Intellectual Property Administration (CNIPA) on Jan. 8, 2021, which is based on and claims priority to and benefits of Chinese Patent Application No. 202020064787.9, filed on Jan. 13, 2020 and Chinese Patent Application No. 202021062203.0 filed on Jun. 10, 2020. The entire content of all of the above-identified applications is incorporated herein by reference.

FIELD

The application relates to the field of batteries, and more specifically, to a battery, a battery module, a battery pack, and an electric vehicle.

BACKGROUND

Battery packs applied to electric vehicles generally includes multiple batteries to increase battery capacity. The multiple batteries are mounted in a case of the battery pack.

In the manufacturing process of the battery, an electrolyte solution needs to be added. Therefore, the battery needs to be sealed to prevent leakage of the electrolyte solution. In the related art, an electrode core is generally directly sealed in a housing, and then the electrolyte solution is injected through an injection port in the housing. The injection port is sealed after the electrolyte solution has been injected to obtain the battery. However, in the above method, the electrode core and the electrolyte solution are directly packaged in the housing of the battery. Once the housing is damaged, the electrolyte solution tends to leak, leading to a poor sealing effect.

SUMMARY

The present disclosure resolves at least one of the technical problems in the related art to some extent.

For this, in a first aspect of the present disclosure, a battery is provided, which includes a metal housing, a packaging member, and multiple electrode core assemblies. The packaging member includes two packaging portions that are arranged opposite to each other. The packaging member has an internal space. The two packaging portions are joined at a predetermined position to divide the internal space of the packaging member into multiple sealed accommodating cavities. At least one sealed accommodating cavity is provided with the electrode core assembly. The metal housing is sleeved outside the packaging member.

In some implementations of the present disclosure, the packaging member is formed by folding an integrally formed packaging film along a predetermined crease. Parts of the packaging film on two sides of the crease respectively form the two packaging portions.

In some implementations of the present disclosure, the two packaging portions are two packaging films.

In some implementations of the present disclosure, a cavity wall of the sealed accommodating cavity includes two sidewalls arranged opposite to each other in a thickness direction of the battery. At least one sidewall of the at least one sealed accommodating cavity is recessed toward an outside of the sealed accommodating cavity to form a groove. The groove is used for receiving the electrode core assembly.

In some implementations of the present disclosure, the two packaging portions are fused and joined at the predetermined position.

In some implementations of the present disclosure, the battery includes a first direction. The multiple electrode core assemblies are arranged in the first direction. The electrode core assembly includes a first electrode and a second electrode. The first electrode and the second electrode are respectively on two sides of the electrode core assembly in the first direction.

In some implementations of the present disclosure, a connection between the first electrode of an electrode core assembly and the second electrode of another electrode core assembly in two electrode core assemblies connected in series are embedded at a joint position corresponding to the two packaging portions.

In some implementations of the present disclosure, an air pressure in the sealed accommodating cavity is lower than an air pressure between the metal housing and the packaging member.

In some implementations of the present disclosure, the air pressure between the metal housing and the packaging member is lower than an air pressure outside the metal housing.

In some implementations of the present disclosure, the air pressure between the metal housing and the packaging member is P1 and ranges from −100 Kpa to −5 Kpa.

In some implementations of the present disclosure, the air pressure in the sealed accommodating cavity is P2. A relationship between P1 and P2 satisfies P1>P2. A range of P1/P2 is 0.05 to 0.85.

In some implementations of the present disclosure, a value of P2 ranges from −100 Kpa to −20 Kpa.

In some implementations of the present disclosure, the battery includes a first direction. The multiple electrode core assemblies are arranged in the first direction. A length of the electrode core assembly extends in the first direction. A length of the battery extends in the first direction. The length of the battery ranges from 400 mm to 2500 mm.

In some implementations of the present disclosure, a thickness of the battery extends in a second direction. The metal housing has two opposite first surfaces in the second direction. At least one first surface is recessed toward an inside of the metal housing.

In some implementations of the present disclosure, the two first surfaces are both recessed toward the inside of the metal housing to clamp the electrode core assembly.

In some implementations of the present disclosure, the battery is generally a cuboid. The thickness of the battery is greater than 10 mm.

In some implementations of the present disclosure, a ratio of the length to the thickness of the battery is 5 to 250.

In some implementations of the present disclosure, a vent hole is provided in the metal housing. A sealing member is provided in the vent hole.

In some implementations of the present disclosure, a wall thickness of the metal housing ranges from 0.05 mm to 1 mm.

In a second aspect of the present disclosure, a battery module is provided, which includes the battery in any foregoing implementation.

In a third aspect of the present disclosure, a battery pack is provided, which includes a battery array. The battery array includes multiple batteries. The battery includes a metal housing, a packaging member, and multiple electrode core assemblies. The packaging member includes two packaging portions that are arranged opposite to each other. The two packaging portions are joined at a predetermined position to divide an internal space of the packaging member into multiple sealed accommodating cavities. At least one sealed accommodating cavity is provided with the electrode core assembly.

The metal housing is sleeved outside the packaging member.

In some implementations of the present disclosure, a thickness of the battery extends in a second direction. The multiple batteries are sequentially arranged in the second direction to form the battery array.

There is a gap between at least two adjacent batteries. A range of a ratio of the gap to the thickness of the battery is 0.001 to 0.15.

In some implementations of the present disclosure, the metal housing includes a housing body with an opening and a cover plate. The cover plate is connected to the opening in the housing body in a sealing manner to close an internal space of the housing body.

The gap includes a first gap d1. The first gap d1 is a minimum distance in the second direction between two cover plates of the two adjacent batteries. The thickness of the battery is a size of the cover plate in the second direction. A range of a ratio of the first gap d1 to the thickness of the battery is 0.005 to 0.1.

In some implementations of the present disclosure, the metal housing includes a housing body with an opening and a cover plate. The cover plate is connected to the opening in the housing body in a sealing manner to close an internal space of the housing body.

The battery has two opposite first surfaces in the second direction. The gap between the two adjacent batteries includes a second gap d2. The second gap d2 is a minimum distance between two first surfaces facing each other of the two adjacent batteries. The thickness of the battery is a size of the cover plate in the second direction.

In some implementations of the present disclosure, the first gap d1 between the batteries before use is greater than the second gap d2 after use.

In a fourth aspect of the present disclosure, an electric vehicle is provided, which includes the battery pack in any foregoing implementation.

Compared with the related art, the present disclosure has beneficial effects as follows. First, in the battery of the present disclosure, the electrode core assembly is packaged in the packaging member, and then the metal housing is sleeved outside the packaging member to implement a double sealing, so that the double-layer sealing of the packaging member and the metal housing can be used to improve the sealing effect. Next, the multiple sealed accommodating cavities are provided in the packaging member to isolate two adjacent electrode core assemblies, thereby preventing an electrolyte solution from flowing between the electrode core assemblies. In this way, the electrode core assemblies do not affect each other, and the electrolyte solution in the electrode core assembly does not decompose due to an excessively large potential difference. In addition, the two packaging films are joined at the predetermined position to form a whole, thereby greatly simplifying the production process, improving the production efficiency, and better adapting to automated operation. Furthermore, the multiple electrode core assemblies are packaged in a metal housing, so that a relatively long battery can be manufactured more conveniently. Therefore, by means of the solution in the present disclosure, it can be very easy to implement a relatively long battery with a high strength. In this way, when a battery is mounted in a case of the battery pack, support structures such as a crossbeam and a longitudinal beam in the body of the battery pack can be omitted. The battery is directly mounted on the case of the battery pack with the support of the battery itself. In this way, the internal space of the battery pack can be saved, the volume utilization of the battery pack can be improved, and the weight of the battery pack can be reduced.

Other aspects and advantages of the present disclosure will be given in the following description, some of which will become apparent from the following description or may be learned from practices of the present disclosure.

Figures 1, 2:
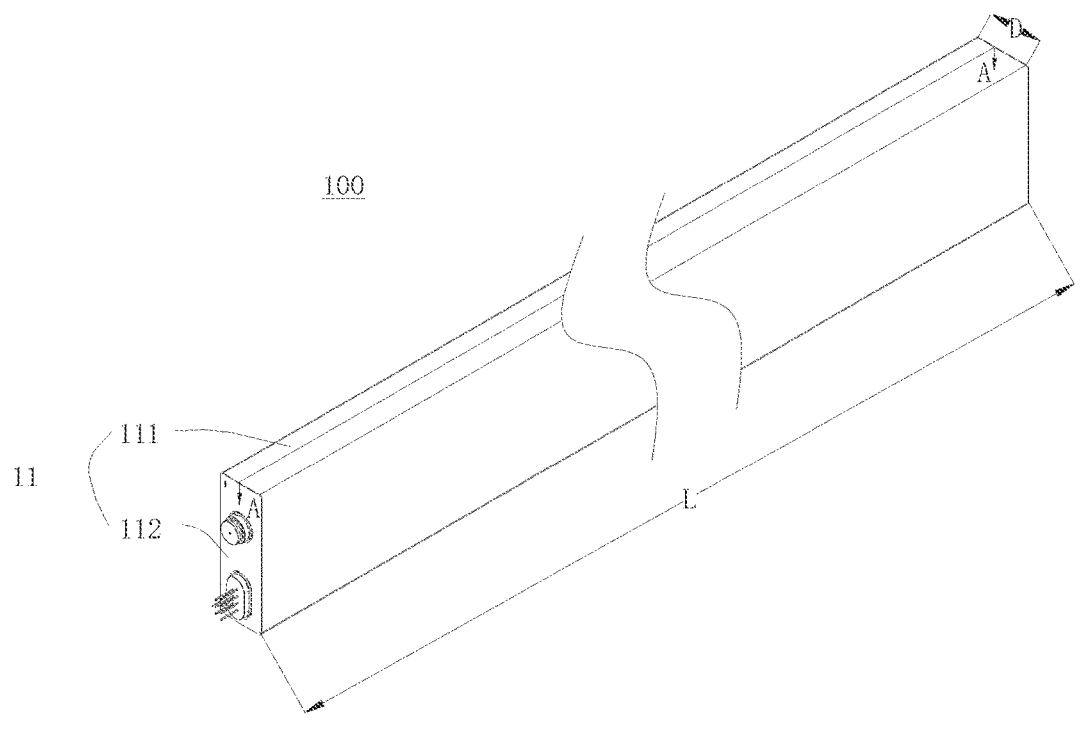
FIG. 1 is a schematic of a three-dimensional structural diagram of a battery according to an embodiment of the present disclosure.
FIG. 2 is a schematic of a sectional view of the battery provided in FIG. 1.

REFERENCE NUMERALS battery 100;
metal housing 11; electrode core assembly 12; packaging portion 13; groove 141; packaging member 15; sealed accommodating cavity 16; packaging film 17;
housing body 111; cover plate 112; first surface 113; concave 114;
first electrode 121; second electrode 122; electrode core assembly body 123;
joint position 131;
battery pack 200;
battery module 300;
electric vehicle 400;
battery array 21; tray 22; support member 221;
length of a battery L;
thickness of a battery D; and
first direction A; and second direction B.

DETAILED DESCRIPTION

The following describes embodiments of the present disclosure in detail. Examples of the embodiments are shown in the accompanying drawings, and same or similar reference signs in all the accompanying drawings indicate same or similar components or components having same or similar functions. The embodiments that are described with reference to the accompanying drawings are exemplary, and are only used to interpret the present disclosure, instead limiting the present disclosure.

In the description of the present disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "axial", "radial", and "circumferential" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present disclosure.

As shown in FIG. 1 to FIG. 5, the present disclosure provides a battery 100. The battery 100 includes a metal housing 11, a packaging member 15, and multiple electrode core assemblies 12. The electrode core assembly 12 includes at least one electrode core. The packaging member 15 includes two packaging portions 13 that are arranged opposite to each other. The packaging member 15 has an internal space. The two packaging portions 13 are joined at a predetermined position to divide the internal space of the packaging member 15 into multiple sealed accommodating cavities 16. At least one sealed accommodating cavity 16 is provided with the electrode core assembly 12. The metal housing 11 is sleeved outside the packaging member 15.

In the present disclosure, the electrode core is an electrode core commonly used in the field of power batteries. The electrode core and the electrode core assembly 12 are components inside the housing of the battery 100 but shall not be understood as the battery 100. The battery 100 is a cell. The electrode core in the present disclosure may be an electrode core formed through winding or may be an electrode core manufactured through stacking. Generally, the electrode core includes at least a positive electrode sheet, a separator, and a negative electrode sheet. It needs to be noted that the battery 100 in the present disclosure is an independent cell, but shall not be simply understood as a battery module 300 or a battery pack because the battery includes multiple electrode cores.

The battery 100 in the present disclosure may be a liquid-state battery with an electrolyte solution in an electrode core, or may be a solid-state battery with a solid electrolyte or a gel polymer electrolyte in an electrode core.

In the present disclosure, the electrode core assembly 12 may be a single electrode core assembly or may include at least two electrode cores. The at least two electrode cores are connected in parallel to form the electrode core assembly 12. For example, two electrode cores are connected in parallel to form the electrode core assembly 12, or four electrode cores are connected in parallel to form the electrode core assembly 12.

The "predetermined position" may be understood as a spacing between two adjacent electrode core assemblies 12 or outer edges of two packaging portions 13. A quantity of the sealed accommodating cavities 16 is not limited, and there may be two, three or more sealed accommodating cavities.

The multiple electrode core assemblies 12 may be connected in series or may be connected in parallel.

By means of the foregoing technical solution, in the battery 100 of the present disclosure, the electrode core assembly 12 is packaged in the packaging member 15, and then the metal housing 11 is sleeved outside the packaging member 15 to implement a double sealing, so that the double-layer sealing of the packaging member 15 and the metal housing 11 can be used to improve the sealing effect. The interior of the packaging member 15 is divided into the multiple sealed accommodating cavities 16, so that two adjacent electrode core assemblies 12 can be isolated, thereby preventing an electrolyte solution from flowing between the electrode core assemblies 12. In this way, the electrode core assemblies 12 do not affect each other, and the electrolyte solution in the electrode core assembly 12 does not decompose due to an excessively large potential difference. In addition, the multiple electrode core assemblies 12 are packaged in a metal housing 11, so that a relatively long battery 100 can be manufactured more conveniently. Therefore, by means of the solution in the present disclosure, it can be very easy to implement a relatively long battery 100. In this way, when a battery 100 is mounted in a case of the battery pack 200, the battery 100 may be used as a crossbeam and a longitudinal beam, so that additional support structures such as a crossbeam and a longitudinal beam in the case of the battery pack 200 can be omitted. The battery 100 is directly mounted on the case of the battery pack 200 with the support of the battery 100 itself. In this way, the internal space of the battery pack 200 can be saved, the volume utilization of the battery pack 200 can be improved, and the weight of the battery pack 200 can be reduced.

Figure 7:
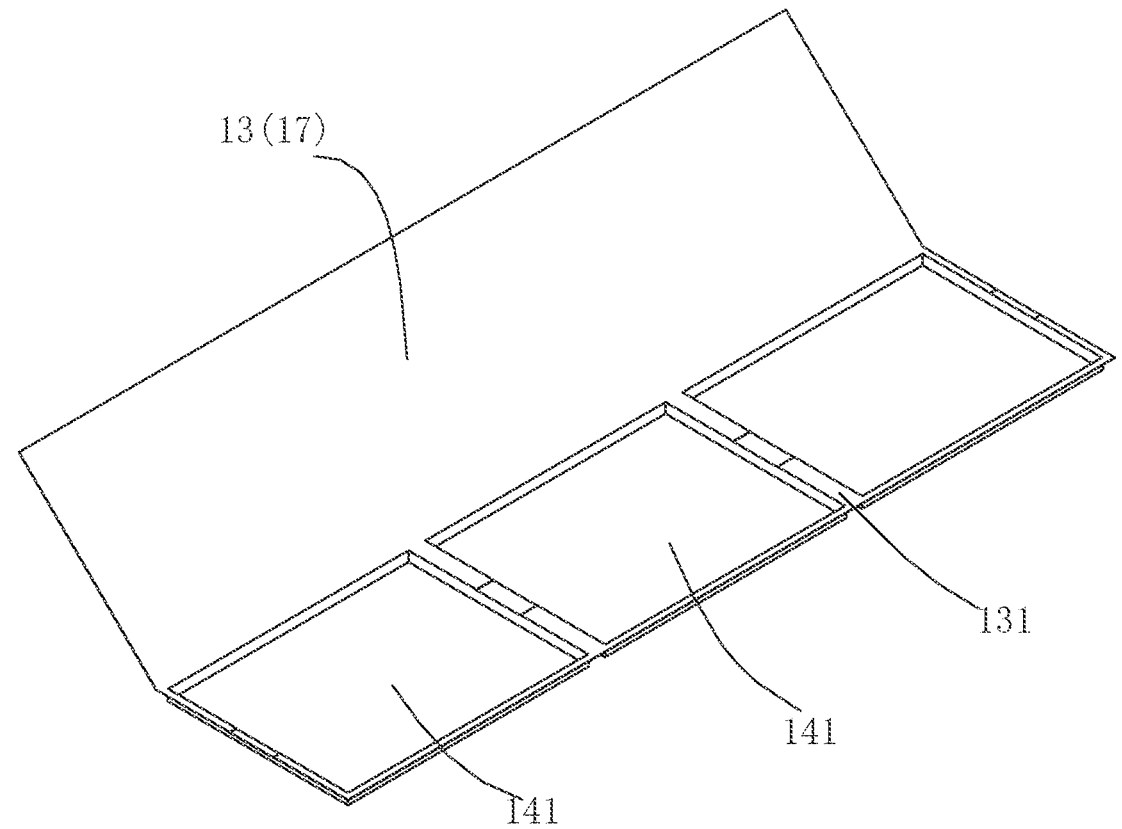
FIG. 7 is a schematic structural diagram of an integrally formed packaging film forming a packaging member according to an embodiment of the present disclosure, where a packaging portion is provided with a groove.
Figure 8:
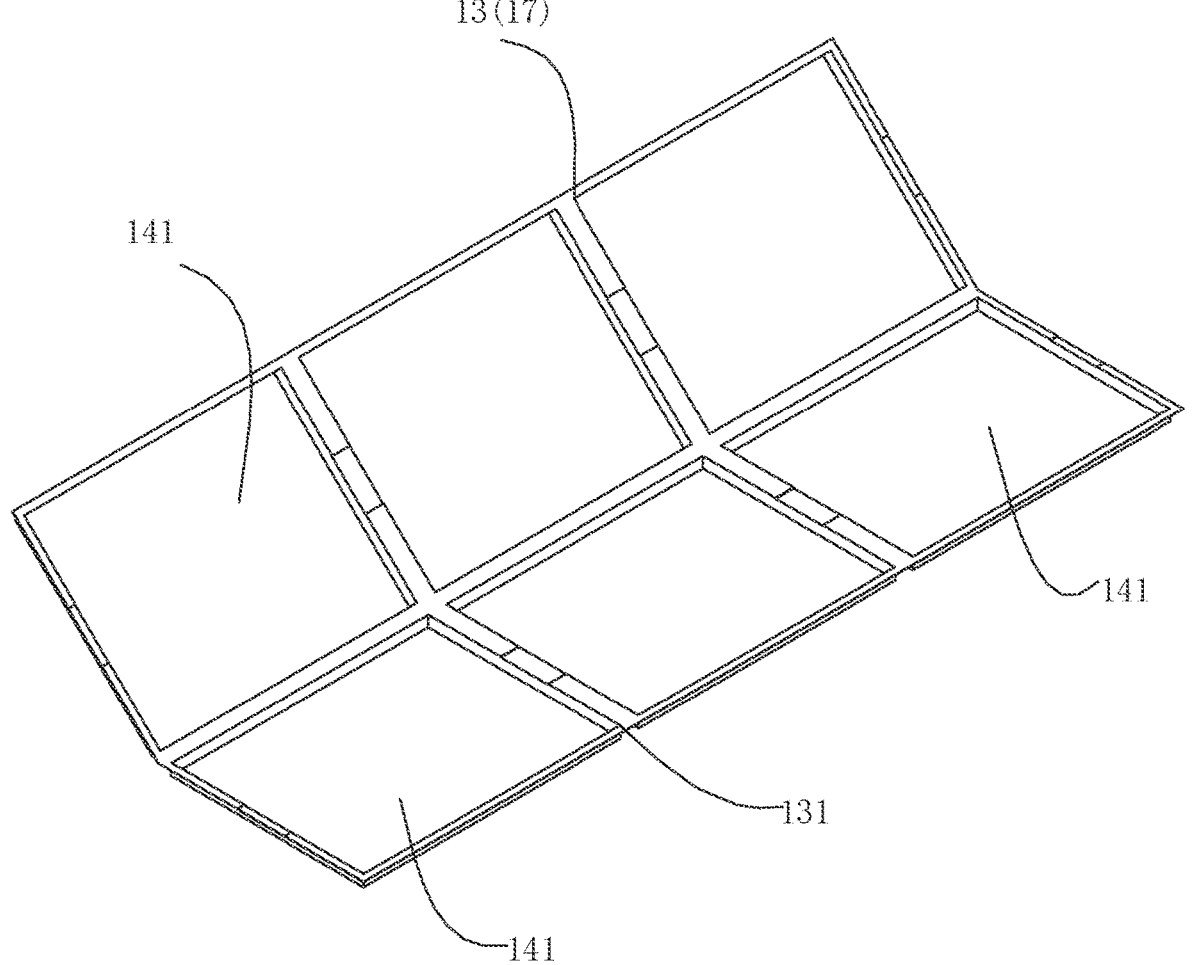
FIG. 8 is a schematic structural diagram of an integrally formed packaging film forming a packaging member according to an embodiment of the present disclosure, where two packaging portions are provided with a groove.
Figure 9:
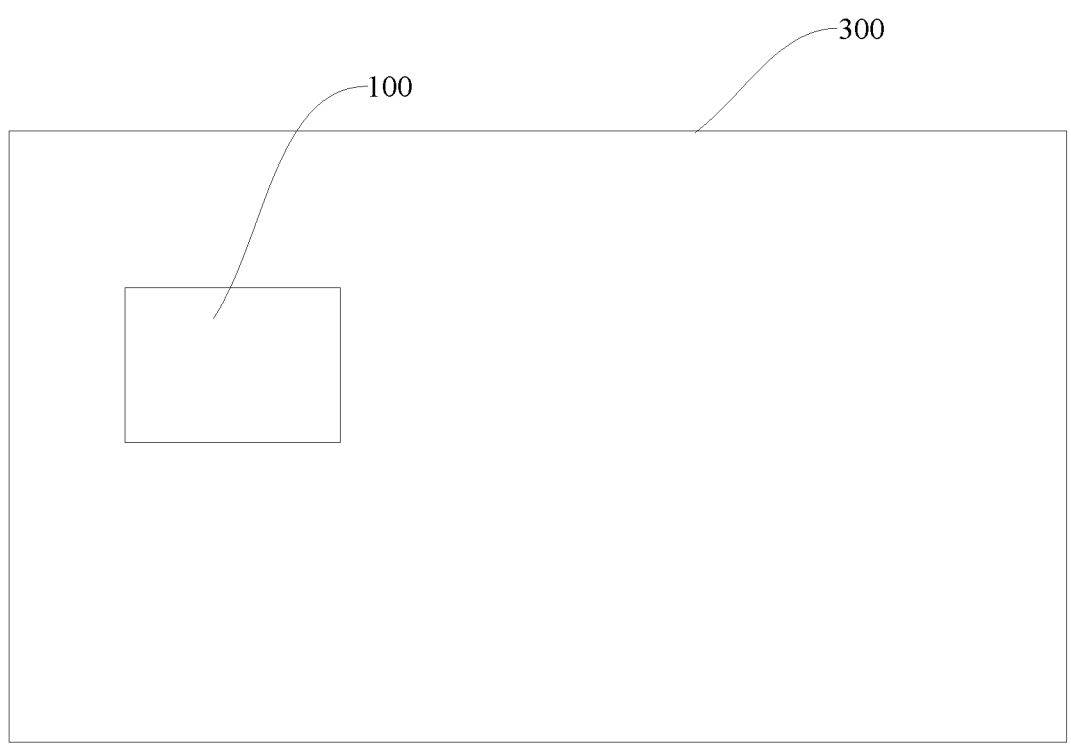
FIG. 9 is a schematic diagram of a relationship between a battery module and a battery according to an embodiment of the present disclosure.
Figure 10:
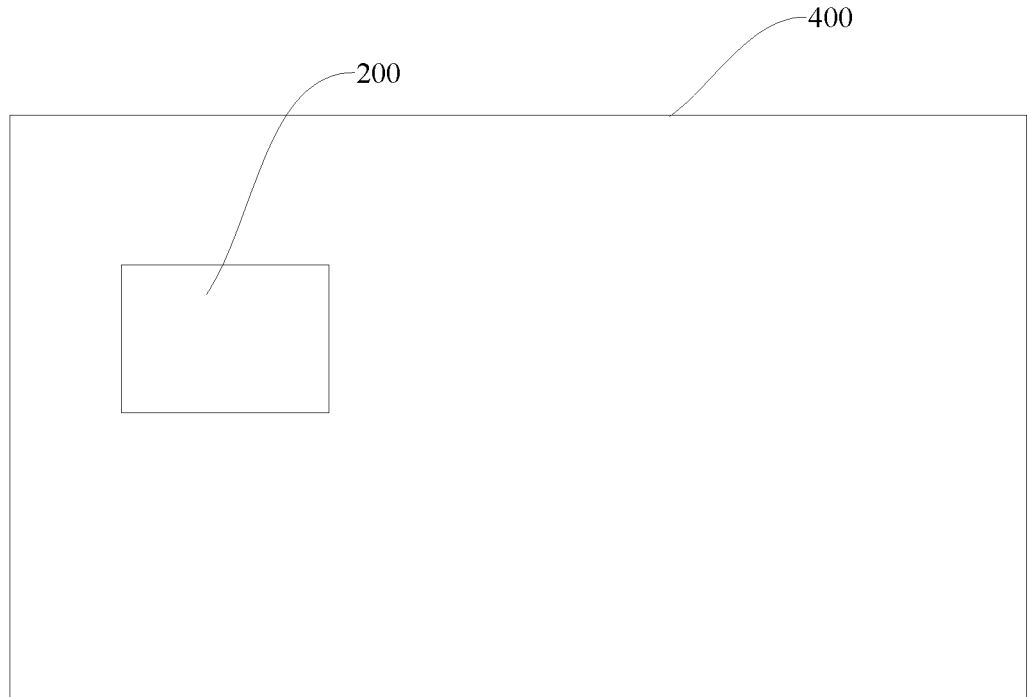
FIG. 10 is a schematic diagram of a relationship between an electric vehicle and a battery pack according to an embodiment of the present disclosure.

In some implementations, two packaging portions 13 are integrally arranged. As shown in FIG. 7 and FIG. 8, the packaging member 15 is formed by folding an integrally formed packaging film 17 along a predetermined crease. Parts of the packaging film 17 on two sides of the crease respectively form the two packaging portions 13.

The packaging member 15 is formed by folding a packaging film 17, so that a joint process between two packaging portions 13 can be omitted, thereby simplifying the process and reducing the production cost.

In some other implementations, the two packaging portions 13 may be separately arranged. The packaging member 15 includes two packaging films 17 arranged opposite to each other. Each packaging film 17 forms the packaging portion 13.

One electrode core assembly 12 or multiple electrode core assemblies 12 may be arranged in each sealed accommodating cavity 16.

In some implementations of the present disclosure, at least one packaging film 17 is provided with a groove 141 to receive the multiple electrode core assemblies 12.

In the implementation, the two packaging films 17 may both be provided with the groove 141 or one packaging film 17 may be provided with the groove 141. When the two packaging films 17 are both provided with the groove 141, as shown in FIG. 8, the grooves 141 in the two packaging films 17 may be arranged opposite to each other or the grooves 141 in the two packaging films 17 may be arranged at an interval.

A specific manner of joining the two packaging films 17 at the predetermined position is not limited. For example, the two packaging films 17 may be fused and connected at a joint position 131 or the two packaging films 17 may be tied together by a strap at a joint position 131.

In some implementations of the present disclosure, a cavity wall of the sealed accommodating cavity 16 includes two sidewalls arranged opposite to each other in a thickness direction of the battery 100. At least one sidewall of the at least one sealed accommodating cavity 16 is recessed toward an outside of the sealed accommodating cavity 16 to form a groove 141. The groove 141 is used for receiving the electrode core assembly 12.

In the foregoing implementation, the two packaging portions 13 form two sidewalls of the sealed accommodating cavity 16 that are arranged opposite to each other in a thickness direction of the battery 100. At least one packaging portion 13 is recessed toward an outside of the sealed accommodating cavity 16 to form a groove 141. The groove 141 may provide a receiving space for the electrode core assembly 12.

One or more grooves 141 may be formed in the cavity wall of the sealed accommodating cavity 16. Each groove 141 may receive one or more electrode core assemblies 12.

In the implementation, the two packaging portions 13 may both be recessed toward the outside of the sealed accommodating cavity 16 to form the grooves 141 for receiving the electrode core assemblies 12. In an embodiment, a packaging portion 13 is recessed to form the groove 141 for receiving the electrode core assembly 12, and another packaging portion 13 is provided with no groove 141. When the grooves 141 are formed in both the two packaging portions 13, as shown in FIG. 8, the grooves 141 formed in the two packaging portions 13 may be arranged opposite to each other or may be arranged at an interval.

A specific manner of joining the two packaging portions 13 at the predetermined position is not limited. The two packaging portions 13 may be tied together by a strap at a joint position. In some implementations, if the packaging member 15 is the packaging films 17, the packaging films 17 may be heated and fused at the joint position and then pressed together. The inside of the packaging member 15 may be divided into the multiple sealed accommodating cavities 16 without other components. The manufacturing process is simpler.

In the battery 100 of the present disclosure, the electrode core assembly 12 is packaged in the packaging film 17, and then the metal housing 11 is sleeved outside the packaging film to implement a double sealing, so that the double-layer sealing of the packaging film 17 and the metal housing 11 can be used to improve the sealing effect. The packaging film 17 is an integral film. The packaging member 17 is provided with the multiple sealed accommodating cavities, so that two adjacent electrode core assemblies 12 can be isolated, thereby preventing an electrolyte solution from flowing between the electrode core assemblies 12. In this way, the electrode core assemblies 12 do not affect each other, and the electrolyte solution in the electrode core assembly 12 does not decompose due to an excessively large potential difference. In addition, the multiple electrode core assemblies 12 are packaged in a metal housing 11, so that a relatively long battery 100 can be manufactured more conveniently. Therefore, by means of the solution in the present disclosure, it can be very easy to implement a relatively long battery with high strength. In this way, when a battery is mounted in a case of the battery pack, support structures such as a crossbeam and a longitudinal beam in the body of the battery pack can be omitted. The battery is directly mounted on the case of the battery pack with the support of the battery itself. In this way, the internal space of the battery pack can be saved, the volume utilization of the battery pack can be improved, and the weight of the battery pack can be reduced.

It needs to be noted that in the foregoing implementation, the packaging member 15 is no longer provided with an additional liquid inlet. An electrolyte solution can be injected before the two packaging portions 13 are completely joined. In an embodiment, the packaging member 15 may be provided with an additional liquid inlet. After the two packaging portions 13 are joined at the predetermined position, an electrolyte solution is injected through the separately provided liquid inlet.

The electrode core assembly 12 includes a first electrode 121 and a second electrode 122. Further, the electrode core assembly 12 includes an electrode core assembly body 123 and the first electrode 121 and the second electrode 122 that are electrically connected to the electrode core assembly body 123 and are used for leading out a current. The first electrode 121 of an electrode core assembly 12 in two electrode core assemblies 12 connected in series is connected to the second electrode of another electrode core assembly 12. The multiple electrode core assemblies 12 are connected in series. In this way, the capacity and voltage can be increased by using cells, thereby simplifying the manufacturing process and reducing the manufacturing cost.

In some implementations, a connection between the first electrode 121 of an electrode core assembly 12 and the second electrode 122 of another electrode core assembly 12 in two electrode core assemblies 12 connected in series are embedded at a joint position 131 corresponding to the two packaging portions 13. In this way, the corrosion of the connection between the first electrode 121 and the second electrode 122 caused by an electrolyte solution can be prevented.

Figure 3:
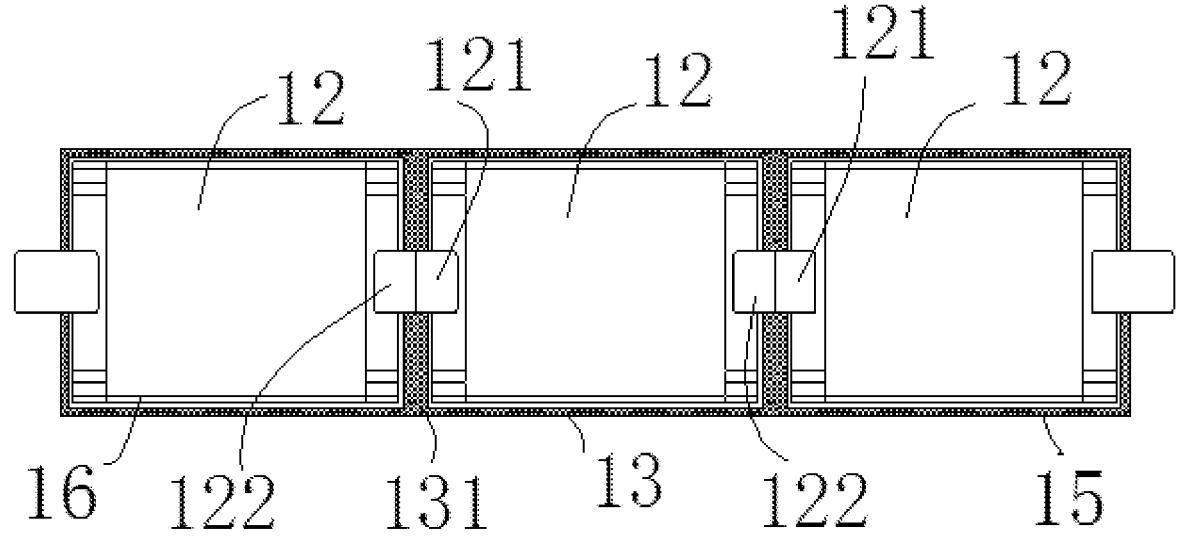
FIG. 3 is a schematic diagram of an electrode core assembly being packaged in a packaging film according to an embodiment of the present disclosure.

In an actual application, for example, as shown in FIG. 3, FIG. 7, and FIG. 8, the multiple electrode core assemblies 12 may be first connected in series, and then one whole packaging film 17 is used to wrap the electrode core assemblies 12 connected in series. For example, the electrode core assemblies 12 connected in series may be placed in a partial area of the packaging film 17 (or a groove 141 may be opened in a partial area of the packaging film 17 in advance, and then the electrode core assemblies 12 connected in series are placed in the groove 141), and another partial area of the packaging film 17 is folded toward the electrode core assemblies 12. Subsequently, the two partial areas of the packaging film 17 are fused and combined. In this way, the electrode core assemblies 12 connected in series are packaged in the same packaging film 17.

The two packaging portions 13 are joined to the first electrode 121 and/or the second electrode 122 at opposite positions to isolate two adjacent electrode core assembly bodies 123, and at least one of the first electrode 121 of an electrode core assembly 12 or the second electrode 122 of another electrode core assembly 12 in the two adjacent electrode core assemblies 12 is located at the joint position 131. In the implementation, the multiple electrode core assembly bodies 123 may be isolated, thereby preventing an electrolyte solution from flowing between the multiple electrode core assemblies 12, so that the multiple electrode core assemblies 12 do not affect each other, and the electrolyte solution in the multiple electrode core assemblies 12 does not decompose due to an excessively large potential difference, thereby ensuring the safety and service life of the battery 100.

It needs to be noted that a series connection manner in this embodiment may be that adjacent electrode core assemblies 12 are connected in series. In a specific manner of implementation, the first electrode 121 and the second electrode 122 on adjacent electrode core assemblies 12 may be directly connected or may be electrically connected by an additional electrical conduction component. In a case that the electrode core assembly 12 includes only one electrode core, the first electrode 121 and the second electrode 122 may be respectively a positive electrode tab and a negative electrode tab of the electrode core or respectively a negative electrode tab and a positive electrode tab of the electrode core. In a case that the electrode core assembly 12 includes multiple electrode cores, the first electrode 121 may be a lead-out component formed by combining and soldering together positive electrode tabs of the multiple electrode cores, and the second electrode 122 may be a lead-out component formed by combining and soldering together negative electrode tabs of the multiple electrode cores. In an embodiment, the first electrode 121 may be a lead-out component formed by combining and soldering together negative electrode tabs of the multiple electrode cores, and the second electrode 122 may be a lead-out component formed by combining and soldering together positive electrode tabs of the multiple electrode cores. The "first" and "second" in the first electrode 121 and the second electrode 122 are only used for distinguishing between names but are not used to limit quantities. For example, there may be one or more first electrodes 121.

The metal housing 11 includes a housing body 111 with an opening and a cover plate 112. The cover plate 112 is connected to the opening in the housing body 11 in a sealing manner, to seal an internal space of the housing body 11. Multiple electrode core assemblies 12 are located in the internal space. Multiple electrode core assemblies 12 are connected in series to form an electrode core string. The first electrode 121 and the second electrode 122 are respectively provided at two ends of the electrode core string. The first electrode 121 of the electrode core string is the first electrode 121 of the electrode core assembly 12 at one end of the electrode core string. The second electrode 122 of the electrode core string is the second electrode 122 of the electrode core assembly 12 at the other end of the electrode core string. The first electrode 121 of the electrode core string and the second electrode 122 of the electrode core string are respectively led out from the cover plate 112.

In an embodiment, two cover plates 112 are arranged. The cover plates 112 are arranged at two opposite ends of the housing body 111 to seal the internal space of the housing body 111. The first electrode 121 and the second electrode 122 are led out from the same cover plate 112. In some other embodiments, the first electrode 121 is led out from a cover plate 112, and the second electrode 122 is led out from another cover plate 112.

That is, the housing body 111 may be provided with openings at two ends. There may be two cover plates 112. The two cover plates 112 are respectively connected to the openings at two ends of the housing body 111 in a sealing manner, to seal the internal space of the housing body 111. In this manner, the first electrode 121 of the electrode core string and the second electrode 122 of the electrode core string may be led out from the same cover plate 112 or may be respectively led out from two cover plates 112. This is not limited.

In some implementations, only one end of the housing body 111 may be provided with an opening, and there is one cover plate 112. The cover plate 112 is connected to the opening at the end of the housing body 111 in a sealing manner. In this manner, the first electrode 121 of the electrode core string and the second electrode 122 of the electrode core string are led out from the same cover plate 112.

In this embodiment of the present disclosure, the electrode core assembly 12 is packaged in the packaging member 15. That is, the packaging member 15 is further arranged between the metal housing 11 and the electrode core assembly 12. The packaging member 15 and the metal housing 11 may implement the double packaging of the electrode core assembly 12, thereby improving the sealing effect of the battery 100. It may be understood that an electrolyte solution is further injected in the packaging member 15. Therefore, in the foregoing manner, the contact between the electrolyte solution and the metal housing 11 can be further prevented, to avoid corrosion of the metal housing 11 or the decomposition of the electrolyte solution.

In some implementations, an air pressure in the sealed accommodating cavity 16 is lower than an air pressure between the metal housing 11 and the packaging member 15. In this way, the packaging member 15 and the electrode core assembly 12 are combined more tightly, thereby improving the strength of the electrode core assembly 12.

In some other implementations, the air pressure between the metal housing 11 and the packaging member 15 is lower than an air pressure outside the metal housing 11.

In the present disclosure, the "air pressure" refers to an atmospheric pressure. The air pressure is the atmospheric pressure applied on a unit area, that is, is equal to the weight of a vertical column of air from the unit area to the upper boundary of the atmosphere.

In a manufacturing process of the battery, to make it convenient to mount the electrode core assembly 12 inside the metal housing 11, a distance between two inner walls of the metal housing 11 that are arranged opposite to each other is greater than the thickness of the electrode core assembly 12. After the electrode core assembly 12 is mounted inside the metal housing 11, a particular gap is reserved between the electrode core assembly 12 and an inner wall of the metal housing 11. The electrode core assembly 12 and the inner wall of the metal housing 11 are not attached tightly enough. The electrode core assembly 12 is prone to a skid inside the metal housing 11, resulting in damage to a current collector, wrinkling of a diaphragm, and falling off an active material, and other problems, which reduces the stability of the battery.

Based on this, the present disclosure limits the air pressure between the metal housing 11 and the packaging member 15, that is, an air pressure in a space between the metal housing 11 and the packaging member 15. The air pressure is lower than the air pressure outside the metal housing 11. That is, there is a negative pressure state between the metal housing 11 and the packaging member 15. The metal housing 11 recesses or deforms under the action of a pressure difference between the inside and outside. A gap between the metal housing 11 and the electrode core assembly 12 decreases accordingly. A space for a skid of the electrode core assembly 12 or a relative displacement between electrode core assemblies deceases. Therefore, the skid of the electrode core assembly 12 and the relative displacement between the electrode core assemblies 12 can be reduced, thereby improving the stability of the battery 100, the strength of the battery 100, and the safety performance of the battery 100.

For example, air suction processing may be performed on the space between the metal housing 11 and the packaging member 15, to implement a negative pressure state in the space between the metal housing 11 and the packaging member 15. In this way, the metal housing 11 can be arranged as close as possible to the electrode core assembly 12 inside the metal housing to reduce an internal interval, so that the electrode core assembly 12 is prevented from skidding in the metal housing 11 and at the same time a relative displacement between the electrode core assemblies 12 is prevented, thereby reducing damage to a current collector, wrinkling of a diaphragm, and falling off an active material, and other cases, improving the mechanical strength of the entire battery 100, extending the service life of the battery 100, and improving the safety performance of the battery 100.

In an implementation, the air pressure between the metal housing 11 and the packaging member 15 is P1. A range of the value of P1 may be −100 Kpa to −5 Kpa. In an embodiment, the value of P1 may be −75 Kpa to −20 Kpa. Certainly, a person skilled in the art my set the value of P1 according to an actual requirement.

In some implementations, the air pressure in the sealed accommodating cavity 16 is P2. A relationship between P1 and P2 satisfies P1>P2. A range of P1/P2 is 0.05 to 0.85.

In an embodiment, a range of the value of P2 is −100 Kpa to −20 Kpa.

A double sealing mode is used for the electrode core assembly 12 in the present disclosure. The electrode core assembly 12 is first packaged in the packaging member 15. To avoid damage to the packaging member 15 because the packaging member 15 bulges outward due to an excessively large air pressure, the air pressure between the metal housing 11 and the packaging member 15 is greater than the air pressure in the packaging member 15. In addition, through verification by extensive experiments, the inventor of the present disclosure found out that, P1, P2, and P1/P2 in the foregoing ranges can adequately ensure the reliability of the double sealing of the battery 100 and an interface between electrode sheets of the battery 100, thereby reducing a gap between the electrode sheets and implementing better conduction of lithium ions.

In the embodiments of the present disclosure, an arrangement direction of the multiple electrode core assemblies 12 is a first direction A. A length direction of the electrode core assembly 12 extends in the first direction A. A length of the battery 100 also extends in the first direction A. That is, the multiple electrode core assemblies 12 are sequentially arranged in the length direction of the battery 100, and the first electrode 121 and the second electrode 122 of the electrode core assembly 12 are respectively on two sides of the electrode core assembly 12 in the first direction A. That is, a "head-to-head" arrangement manner is used for the multiple electrode core assemblies 12. This arrangement manner can conveniently connect the electrode core assemblies 12 two by two, so that the connection structure is simple. In addition, this arrangement manner can conveniently manufacture a relatively long battery 100. Therefore, when the battery 100 is mounted in a case of the battery 200, it may not be necessary to arrange support structures such as a crossbeam and a longitudinal beam. Instead, the metal housing 11 of the battery 100 is used as a support to directly mount the battery 100 on the case of the battery pack 200. In this way, the internal space of the battery pack 200 can be saved, thereby improving the volume utilization of the battery pack 200 and reducing the weight of the battery pack 200.

Compared with an existing manner in which only one electrode core is arranged, multiple electrode core assemblies 12 are arranged in the battery, so that a relatively long battery can be manufactured more conveniently. In a conventional battery, once the battery is relatively long, the lengths of copper and aluminum foils used as a current collector inside the battery are correspondingly increased. As a result, the resistance inside the battery is greatly increased, which fails to meet current requirements for higher power and quicker charging. In the case of the same battery length, the embodiments of the present disclosure can greatly reduce the resistance inside the battery, thereby avoiding problems such as battery overheating in a case such as high-power output or quick charge.

The battery 100 is generally a cuboid. A length L of the battery 100 is 400 mm to 2500 mm (millimeters), for example, may be 500 mm, 1000 mm or 1500 mm.

A thickness D of the battery 100 is greater than 10 mm, for example, may be a range of 13 mm to 75 mm.

In this embodiment of the present disclosure, a ratio of the length to the thickness of the battery 100 is 5 to 250.

In the embodiments of the present disclosure, the thickness of the battery 100 extends in a second direction B perpendicular to the first direction A. The metal housing 11 has two opposite first surfaces 113 in the second direction B. The first surface 113 is a maximum surface of the battery 100, that is, a "large surface" of the battery 100. The at least one first surface 113 is recessed toward the inside of the metal housing 11. In this way, the metal housing 11 may be attached to the electrode core assembly 12 as much as possible.

Because the metal housing 11 has a relatively small thickness and is a relatively thin sheet, a concave 114 in the first surface 113 of the metal housing 11 may be, for example, a concave formed when air suction is performed in the metal housing 11. That is, when air suction processing is performed in the space between the metal housing 11 and the packaging member 15 to make the air pressure between the metal housing 11 and the packaging member 15 lower than the air pressure outside the metal housing 11, along with the air suction, the first surface 113 of the metal housing 11 tends to form the concave 114 in the metal housing 11.

During the normal use of the battery, due to the expansion of the material, gas generation from an electrolyte solution usually expands, or the like, an area with the largest expansion and deformation usually takes place on the large surface of the battery. By means of the technology in the present disclosure, the large surface of the battery in an initial state is limited through vacuuming to slightly recessed, so that the compression between batteries after the batteries expand can be effectively mitigated, thereby improving the service life, the safety performance, and the like of the battery and the entire system.

Figure 4:
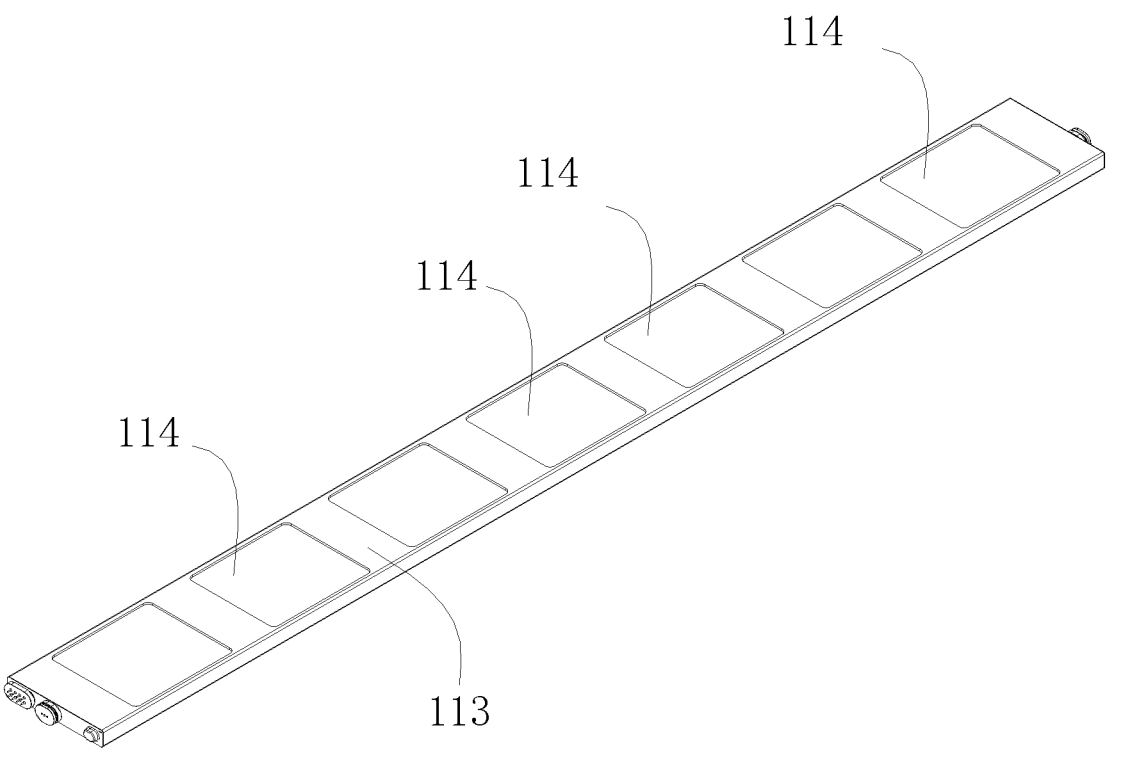
FIG. 4 is a schematic diagram of a concave being formed in a first surface of a metal housing according to an embodiment of the present disclosure.
Figure 5:
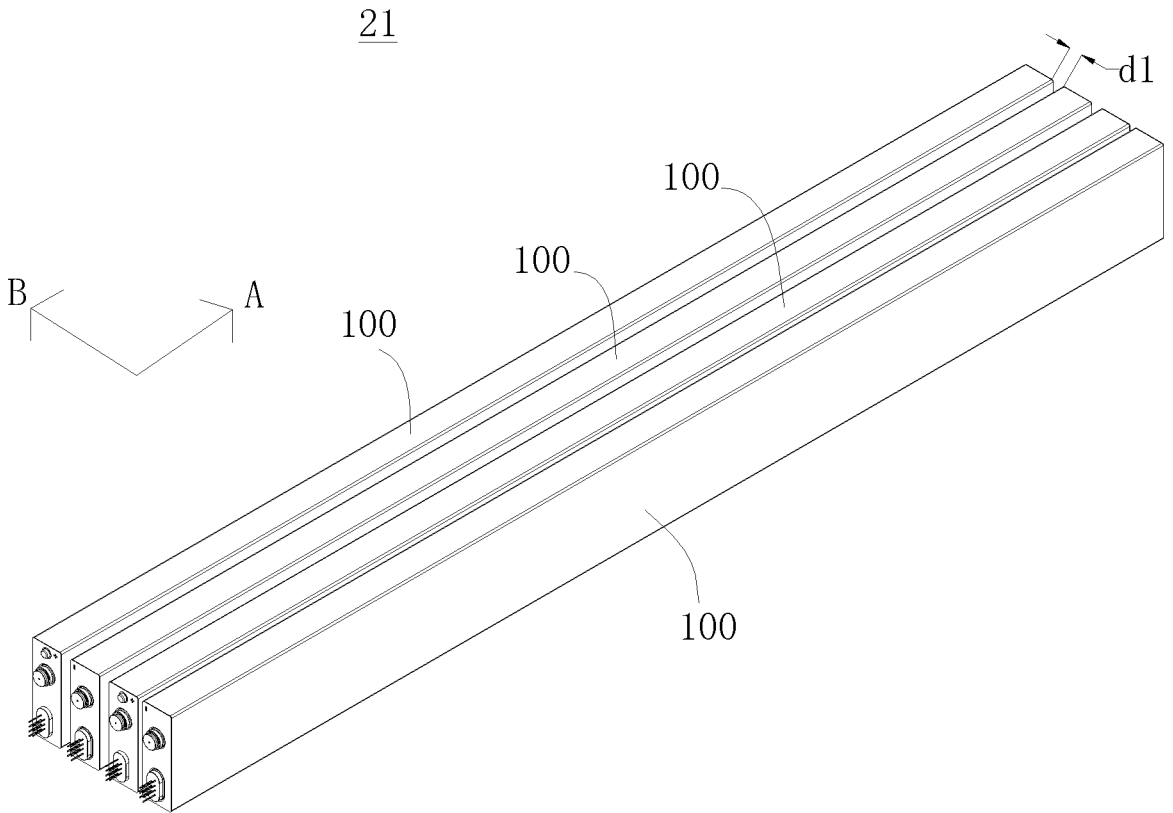
FIG. 5 is a schematic structural diagram of a battery array according to an embodiment of the present disclosure.

In some other embodiments, as shown in FIG. 4, after the concave 114 is formed in the first surface 113 of the metal housing 11 in advance, air suction processing may be performed in the metal housing 11 in advance. There may be multiple concaves 114 in the first surface 113 of the metal housing 11. For example, the multiple concaves 114 are formed in advance in the first surface 113. The position of each concave corresponds to a position at which one electrode core assembly 12 is located.

In some implementations, two opposite first surfaces 113 of the metal housing 11 are both recessed toward the inside, to clamp the electrode core assembly 12 through a recessed area.

A vent hole may be provided in the metal housing 11. An air suction operation is performed on the space between the metal housing 11 and the packaging member through the vent hole. Sealing processing needs to be performed on the vent hole. Therefore, a sealing member is further arranged in the vent hole, to seal the vent hole. The sealing member may be a plug, a rubber member, or the like. This is not limited.

In some implementations, before air suction is performed on the metal housing 11, a gap is provided between the electrode core assembly 12 and an inner surface of the metal housing 11. The gap makes it relatively convenient for the electrode core assembly 12 to be mounted in the metal housing 11. After air suction is performed on the metal housing 11, the metal housing 11 compresses an outer surface of the electrode core assembly 12 in the second direction to clamp the electrode core assembly 12, thereby reducing a space for the electrode core assembly 12 to skid inside the metal housing 11, thereby improving the safety performance of the battery 100.

In the embodiments of the present disclosure, the metal housing 11 has a high strength, and the heat dissipation effect is high. The metal housing 11 may include, but not limited to, an aluminum housing or a steel housing.

In some embodiments, the thickness of the metal housing 11 is 0.05 mm to 1 mm.

When the thickness of the metal housing 11 is relatively large, the weight of the battery 100 is increased, and the capacity of the battery 100 is reduced. In addition, when the thickness of the metal housing 11 is excessively large, under the action of the atmospheric pressure, the metal housing 11 does not tend to recess or deform toward a side of the electrode core assembly 12, the interval between the metal housing 11 and the electrode core assembly 12 cannot be reduced, and as a result the electrode core assembly 12 fails to be effectively positioned. Moreover, when the thickness of the metal housing 11 is excessively large, the cost of air suction is increased, resulting in an increase in the manufacturing cost.

In the present disclosure, the thickness of the metal housing 11 is set within the foregoing range, so that the strength of the metal housing 11 can be ensured, and the capacity of the battery 100 is not reduced. In a negative pressure state, the metal housing 11 is more likely to deform. When the thickness of the metal housing 11 is limited within the foregoing range, the interval between the metal housing 11 and the electrode core assembly 12 can be reduced, thereby reducing the skid of the electrode core assembly 12 inside the metal housing 11 and a relative displacement between the electrode core assemblies 12.

In the embodiments of the present disclosure, the packaging film 17 includes a nonmetal outer-layer film and a nonmetal inner-layer film that are stacked. The inner-layer film is located between the outer-layer film and the electrode core assembly 12.

The inner-layer film has high chemical stability, and may be, for example, a material resistant to electrolyte solution corrosion, for example, may be polypropylene (PP), polyethylene (PE) or polyethylene terephthalate (PET) or may be a combination of multiple materials in the foregoing materials.

The outer-layer film is a protective layer. The outer-layer film may be used to stop the permeation air, especially, moisture, oxygen, or the like. The material of the outer-layer film may be, for example, PET, polyamide or multiple or may be a combination of multiple materials in the foregoing materials.

In the packaging film 17 of this embodiment, the melting point of the outer-layer film is greater than the melting point of the inner-layer film, so that during the fused sealing, the outer-layer film can be prevented from being melted, while the inner-layer film can be melted in time to ensure excellent sealing performance. In an embodiment, a melting point difference between the outer-layer film and the inner-layer film may range from 30° C. to 80° C. For example, the melting point difference may be 50° C. or 70° C. The selection of a specific material may be determined according to an actual requirement.

The nonmetal outer-layer film and the nonmetal inner-layer film are bonded and combined by an adhesive. For example, the material of the outer-layer film may be PP, the material of the inner-layer film may be PET, and a bonder for bonding the two may be a polyolefin bonder for bonding to form a composite film.

In this embodiment, a double-layer nonmetal film is used to form the packaging film 17 to package the electrode core assembly 12. Because the nonmetal packaging film 17 is used, higher tensile strength and a larger percentage of elongation at break are provided, so that the limitation on the thickness of the battery 100 can be reduced, so that the produced battery 100 has a larger thickness. The thickness of the battery 100 in this embodiment has a large expandable range, for example, may be greater than 10 mm, or, may be within a range of 13 mm to 75 mm.

In some implementations of the present disclosure, the packaging film 17 is an aluminum plastic film.

In an embodiment of the present disclosure, the battery is a lithium ion battery.

In another aspect of the present disclosure, a battery module 300 is provided, which includes the battery 100 in any foregoing embodiment. When the battery module 300 provided in the present disclosure is used, the sealing performance is good, the assembly process is simplified, and the cost of the battery 100 is low.

Figure 6:
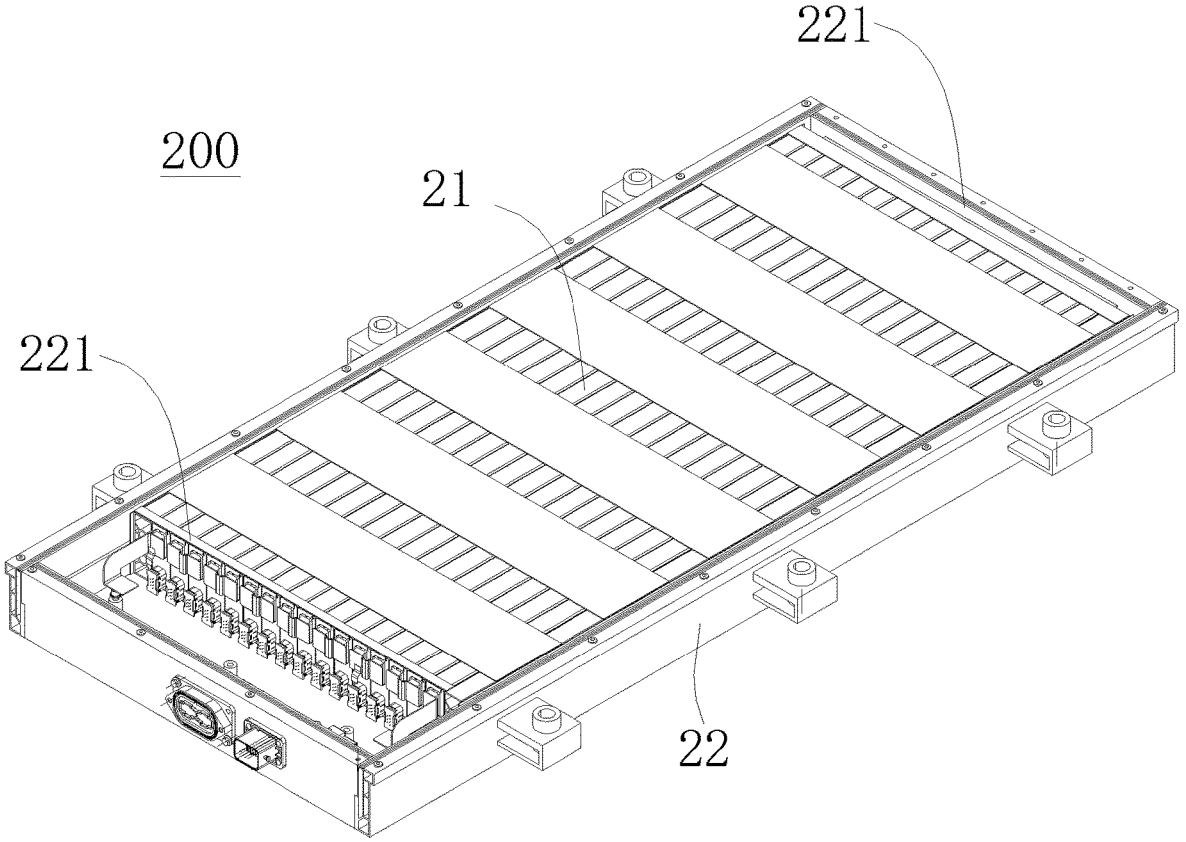
FIG. 6 is a schematic structural diagram of a battery pack according to an embodiment of the present disclosure.

Referring to FIG. 6 and FIG. 7, the present disclosure further provides a battery pack 200, which includes a battery array 21. The battery array 21 includes multiple batteries 100. Each battery 100 is the battery 100 described in any foregoing embodiment. Therefore, the details of the specific structure of the battery 100 are no longer described.

There may be one or more battery arrays 21. There may be one or more batteries 100 in each battery array 21. During actual production, a quantity of the batteries 100 may be set according to an actual requirement. A quantity of the battery arrays 21 may be set according to an actual requirement. This is not specifically limited in the present disclosure.

In the embodiments of the present disclosure, a length direction of the battery 100 extends in a first direction A, and a thickness direction of the battery extends in a second direction B perpendicular to the first direction A. Several batteries 100 are sequentially arranged in the second direction B to form the battery array 21. There is a gap between at least two adjacent batteries 100. A range of a ratio of the gap to the thickness of the battery 100 is 0.001 to 0.15.

It needs to be noted that the gap between two adjacent batteries 100 changes as the operating time of the batteries increases. However, during the operation, before the operation, or before the batteries are delivered, provided that the range of the ratio of the gap between the batteries to the thickness falls within a range defined in the present disclosure, the gap falls within the protection scope of the present disclosure.

In the present disclosure, a particular gap is reserved between the batteries 100, so that a cushioning space is reserved for the expansion of the batteries 100.

The expansion of the battery 100 is related to the thickness of the battery 100. When the thickness of the battery 100 is larger, the battery 100 is more likely to expand. A ratio of the gap between the batteries 100 to the thickness of the battery 100 is set within 0.001 to 0.15 in the present disclosure, so that the space of the battery pack 200 can be fully utilized, thereby improving the utilization of the battery pack 200 and at the same time providing better cushioning for the expansion of the battery 100.

In addition, heat is generated when the battery 100 expands. A particular gap is reserved between the batteries 100. The gap may be used as a heat dissipation channel such as an air passage. A surface of the battery 100 with a larger area has a better heat dissipation effect. Therefore, the heat dissipation efficiency of the battery pack 200 can be further improved, and the safety performance of the battery pack 200 can be improved.

In the foregoing solution, the gap between the batteries 100 may be understood as that no structural member is arranged between the batteries 100, and only a particular gap is reserved, or may be understood as that another structural member is arranged between the batteries 100, so that one battery 100 is separated from another battery 100 by the structural member.

It needs to be noted that when a structural member is arranged between the batteries 100, the gap between the batteries 100 should be understood as a distance between the batteries 100 on two sides of the structural member but shall not be understood as an interval between the structural member and the battery 100.

It should be noted that particular gaps may be reserved between the structural member and the batteries 100 on two sides of the structural member, or the structural member may directly contact the batteries. When the structural member directly contacts the batteries 100 on the two sides, the structural member should have particular flexibility to provide cushioning for the expansion of the battery 100. The structural member includes, but not limited to, aerogel, a thermally conductive structural adhesive or a thermal insulation foam.

In the present disclosure, when there are multiple battery arrays 21, the gap should be an interval between two adjacent batteries 100 in the same battery array 21 rather than an interval between two adjacent batteries 100 in different battery arrays 21. In addition, in the same battery array 21, a particular gap may be reserved between every two adjacent batteries 100 or a particular gap may be reserved between two adjacent batteries 100 in some batteries.

In an implementation, the gap between two adjacent batteries 100 includes a first gap d1. The first gap d1 is defined as a minimum distance in the second direction B between two cover plates 112 of the two adjacent batteries 100. The thickness of the battery 100 is a size of the cover plate 112 in the second direction B. A range of a ratio of the first gap d1 to the thickness of the battery 100 is 0.005 to 0.1.

It needs to be noted that when the battery 100 has two cover plates 112, for a battery array 21, the first gap d1 is a minimum distance in the second direction B between two cover plates 112 on the same side of the two adjacent batteries 100.

When the battery 100 has only one cover plate 112, for a battery array 21, cover plates of two adjacent batteries 100 may be located on the same side, and the first gap d1 is a minimum distance in the second direction B between two cover plates 112 on the same side of the two adjacent batteries 100.

When the battery 100 has only one cover plate 112, for a battery array 21, cover plates 112 of two adjacent batteries 100 may be located on different sides, and the first gap d1 is a minimum distance in the second direction B between two cover plates 112 of the two adjacent batteries 100. The first gap d1 shall not be understood as a minimum distance in the first direction A between two cover plates 112 of the two adjacent batteries 100.

"The minimum distance in the second direction B" may be understood as a distance between projections of cover plates 112 of two adjacent batteries 100 in the second direction B, or may be understood as a distance between neighboring surfaces of two cover plates 112. The "distance between neighboring surfaces" is a distance between neighboring surfaces of the cover plates 112 of two adjacent batteries 100.

In the foregoing implementation, because the cover plate 112 has relatively high strength, compared with the housing body 111, expansion is not likely to take place. Even if chemical reactions take place inside the battery 100 after operation for a period of time, the battery 100 expands to compress adjacent batteries 100, and the first gap d1 changes (gradually increases), the change is relatively small and is ignorable. Or even there is a change, the ratio of the first gap d1 to the thickness of the battery 100 still meets the foregoing range. In the foregoing implementation, cover plates 112 are respectively arranged at two ends of the housing body 111. When the batteries 100 are arranged in the thickness direction into the battery array 21, the gap between two batteries 100 is a minimum interval between two cover plates 112 at the same end of the battery array 21 rather than an interval between two cover plates 112 at different ends of the batteries 100.

In an implementation, the gap between two adjacent batteries 100 includes a second gap d2. The second gap d2 is a minimum distance between two first surfaces 113 facing each other of the two adjacent batteries 100. The first gap d1 between the batteries 100 before use is greater than the second gap d2 after use.

The "before use" may be understood as that the battery 100 has been assembled and waits for delivery or has been delivered but has not supplied power externally. The "after use" may be understood as that the battery 100 has supplied power externally. For example, the battery pack 200 is assembled in an electric vehicle 400. The state before use may be understood as the state of a new vehicle, and the state after use may be understood as the state of the vehicle after the vehicle has traveled a distance.

In the implementation, the second gap should be a minimum interval between two opposite first surfaces 113 of two adjacent batteries 100. The interval gradually decreases as the use time of the batteries increases. The main reason is that after the batteries expand, an interval between two adjacent large surfaces gradually decreases.

In the embodiments of the present disclosure, the battery pack 200 further includes a battery cover and a tray 22. The battery cover is not schematically shown in the diagram of FIG. 7. The battery cover is connected to the tray 22 in a sealing manner to form a battery accommodating cavity. The battery array 21 is located in the battery accommodating cavity. The tray 22 includes a support member 221. A support area is formed on the metal housing 11 of the battery 100. The battery 100 is joined to the support member 221 by the support area of the battery to be supported on the support member 221.

In an embodiment, the tray 22 includes a side beam. The side beam is used as the support member 221. Two ends of the battery 100 in the length direction of the battery are supported on the side beam.

In the battery 100 in the embodiments of the present disclosure, the air pressure between the metal housing 11 and the packaging member 15 is a negative pressure, so that the overall strength of the battery 100 can be improved. Therefore, the battery 100 may be directly mounted on the tray 22 by using the strength of the battery as a support, so that it is not necessary to arrange a structure such as a crossbeam and a longitudinal beam on the tray 22 to support the battery 100, thereby helping to improve the utilization of the internal space of the battery pack 200.

An electric vehicle 400 includes the foregoing battery pack 200. The electric vehicle 400 provided in the present disclosure has a long range and a relatively low cost.

In the description of the present disclosure, it should be noted that, unless otherwise explicitly stipulated and restricted, terms "installation", "joint connection", and "connection" should be understood broadly, which, for example, may be a fixed connection, or may be a detachable connection, or an integral connection; or may be a mechanical connection, or may be an electrical connection; or may be a direct connection, or may be an indirect connection by using a medium, or may be an internal communication between two components. A person of ordinary skill in the art may understand the specific meanings of the foregoing terms in the present disclosure according to specific situations.

In description of the specification, description of reference terms such as "an embodiment", "a specific embodiment" or "an example" means including specific features, structures, materials, or features described in the embodiment or example in at least one embodiment or example of the present disclosure. In this specification, exemplary descriptions of the foregoing terms do not necessarily refer to the same embodiment or example. In addition, the described specific features, structures, materials, or characteristics may be combined in a proper manner in any one or more of the embodiments or examples.

Although the embodiments of the present disclosure are already shown and described above, a person of ordinary skill in the art is to be understood that various changes, modifications, replacements, and variations may be made to the embodiments without departing from the principles and spirit of the present disclosure, and the scope of the present disclosure is defined by the appended claims and their equivalents.

What is claimed is:

1. A battery, comprising a metal housing, a packaging member, and a plurality of electrode core assemblies; wherein:
the packaging member comprises two packaging portions that are arranged opposite to each other; the two packaging portions are joined at a plurality of positions to divide an internal space of the packaging member into a plurality of sealed accommodating cavities; each of the two packaging portions is formed integrally as a single piece; and at least one of the sealed accommodating cavities is provided with one of the electrode core assemblies; and
the metal housing is sleeved outside the packaging member, the metal housing has two opposite first surfaces, and a concave corresponding to each of the sealed accommodating cavities is formed on at least one of the two first surfaces of the metal housing.

2. The battery according to claim 1, wherein the packaging member is formed by folding a packaging film along a crease, and two parts of the packaging film on two sides of the crease respectively form the two packaging portions.

3. The battery according to claim 1, wherein the two packaging portions correspond to two packaging films.

4. The battery according to claim 1, wherein each of the sealed accommodating cavities is surrounded by two sidewalls opposite to each other in a thickness direction of the battery, at least one of the two sidewalls is recessed toward an outside of the sealed accommodating cavity to form a groove, and the groove receives the electrode core assembly.

5. The battery according to claim 1, wherein the two packaging portions are fused and joined at the positions.

6. The battery according to claim 1, wherein the electrode core assemblies are arranged in a first direction, each of the electrode core assemblies comprises a first electrode and a second electrode, and the first electrode and the second electrode are provided on two sides of each of the electrode core assemblies respectively along the first direction.

7. The battery according to claim 6, wherein a first electrode of a first electrode core assembly and a second electrode of a second electrode core assembly are connected in series at a junction, wherein the junction is embedded at one of the positions where the two packaging portions are joined.

8. The battery according to claim 1, wherein an air pressure in the sealed accommodating cavities is lower than an air pressure between the metal housing and the packaging member.

9. The battery according to claim 1, wherein an air pressure between the metal housing and the packaging member is lower than an air pressure outside the metal housing.

10. The battery according to claim 9, wherein the air pressure between the metal housing and the packaging member is P1 and ranges from −100 Kpa to −5 Kpa.

11. The battery according to claim 10, wherein an air pressure in the sealed accommodating cavities is P2, and wherein P1>P2, and a ratio between P1 and P2 ranges from 0.05 to 0.85.

12. The battery according to claim 11, wherein P2 ranges from −100 Kpa to −20 Kpa.

13. The battery according to claim 1, wherein the electrode core assemblies are arranged along a first direction, a length of each of the electrode core assemblies extends in the first direction, and a length of the battery extends in the first direction and ranges from 400 mm to 2500 mm.

14. The battery according to claim 13, wherein a thickness of the battery extends in a second direction, and the two opposite first surfaces are in the second direction.

15. The battery according to claim 14, wherein the two first surfaces are recessed toward an inside of the metal housing to clamp the electrode core assembly.

16. The battery according to claim 13, wherein the battery is a cuboid, and a thickness of the battery is greater than 10 mm.

17. The battery according to claim 16, wherein a ratio of the length to the thickness of the battery is 5 to 250.

18. The battery according to claim 1, wherein a vent hole is provided in the metal housing, and a sealing member is provided in the vent hole.

19. The battery according to claim 1, wherein a wall thickness of the metal housing ranges from 0.05 mm to 1 mm.

20. A battery module, comprising the battery according to claim 1.

21. A battery pack, comprising a battery array, wherein:
the battery array comprises a plurality of batteries, and each of the batteries comprises a metal housing, a packaging member, and a plurality of electrode core assemblies;
a thickness of each of the batteries extends in a second direction, and the plurality of batteries are arranged in the second direction to form the battery array; and a gap is provided between two adjacent batteries, and a ratio of the gap to the thickness of each of the batteries ranges from 0.001 to 0.15;

the packaging member comprises two packaging portions that are arranged opposite to each other, the two packaging portions are joined at a plurality of positions to divide an internal space of the packaging member into a plurality of sealed accommodating cavities, each of the two packaging portions is formed integrally as a single piece, and at least one of the sealed accommodating cavities is provided with one of the electrode core assemblies; and the metal housing is sleeved outside the packaging member.

22. The battery pack according to claim 21, wherein the metal housing comprises a housing body with an opening and a cover plate, and the cover plate is connected to the opening to seal an internal space of the housing body; and the gap comprises a first gap d1, the first gap d1 is a minimum distance in the second direction between two cover plates of the two adjacent batteries, the thickness of each of the batteries is equal to a size of the cover plate in the second direction, and a ratio of the first gap d1 to the thickness of each of the batteries ranges from 0.005 to 0.1.

23. The battery pack according to claim 22, wherein each of the batteries has two opposite first surfaces in the second direction, the gap comprises a second gap d2, the second gap d2 is a minimum distance between two first surfaces of the two adjacent batteries facing each other.

24. The battery pack according to claim 23, wherein the first gap d1 between the two adjacent batteries before use is greater than the second gap d2 after use.

25. An electric vehicle, comprising the battery pack according to claim 21.

* * * * *